United States Patent
Launay et al.

(10) Patent No.: US 10,627,284 B2
(45) Date of Patent: Apr. 21, 2020

(54) OPTICAL-FIBRE SENSOR DEVICE

(71) Applicant: THALES, Courbevoie (FR)

(72) Inventors: François-Xavier Launay, Sophia Antipolis (FR); Raphael Lardat, Sophia Antipolis (FR); Gérard Roux, Sophia Antipolis (FR)

(73) Assignee: THALES, Courbevoie (FR)

( * ) Notice: Subject to any disclaimer, the term of this patent is extended or adjusted under 35 U.S.C. 154(b) by 162 days.

(21) Appl. No.: 15/561,056

(22) PCT Filed: Mar. 24, 2016

(86) PCT No.: PCT/EP2016/056539
§ 371 (c)(1),
(2) Date: Sep. 24, 2017

(87) PCT Pub. No.: WO2016/156197
PCT Pub. Date: Oct. 6, 2016

(65) Prior Publication Data
US 2018/0073916 A1 Mar. 15, 2018

(30) Foreign Application Priority Data

Mar. 27, 2015 (FR) ..................................... 15 00613

(51) Int. Cl.
*G01H 9/00* (2006.01)
*G01D 5/26* (2006.01)
*G01V 1/18* (2006.01)

(52) U.S. Cl.
CPC ............. *G01H 9/004* (2013.01); *G01D 5/264* (2013.01); *G01V 1/186* (2013.01)

(58) Field of Classification Search
CPC ......... G01H 9/004; G01D 5/264; G01V 1/186
See application file for complete search history.

(56) References Cited

U.S. PATENT DOCUMENTS

2003/0026534 A1* 2/2003 Skull .................... G02B 6/0218
385/27

FOREIGN PATENT DOCUMENTS

CN     102 288 226 B     2/2013
WO    2010/123566 A1    10/2010
(Continued)

OTHER PUBLICATIONS

Hansen et al., "Modelling of Hydrophone Based on a DFB Fiber Laser," XXI ICTAM, Proceedings of 21st International Congress of Theoretical and Applied Mechanics, Aug. 15, 20014, XP055195241.

*Primary Examiner* — Ryan A Lepisto
(74) *Attorney, Agent, or Firm* — Baker & Hostetler LLP

(57) ABSTRACT

There is provided a method for manufacturing an optical-fibre sensor device, including an enclosure defining a cavity and an optical-fibre sensor including an optical-fibre and a device for holding the sensor rigidly connected to the optical fibre, the optical fibre passing through the holding device between two attachment points. The method comprises: positioning the optical-fibre sensor in the enclosure to pass the fibre through two passage openings provided on the enclosure, which defines two optical-fibre portions in the enclosure, on either side of the holding device, each fibre portion extending between one of the attachment points and one of the passage openings; holding the optical-fibre sensor in position; performing a differential elongation of the enclosure relative to the optical-fibre sensor in the longitudinal direction and towards the outside of the enclosure, the optical-fibre sensor remaining held in position; attaching the optical fibre to the enclosure at the passage openings.

12 Claims, 6 Drawing Sheets

(56) References Cited

FOREIGN PATENT DOCUMENTS

| WO | 2010/136723 | A1 | 12/2010 |
| WO | 2012/140179 | A1 | 10/2012 |

\* cited by examiner

OPTICAL-FIBRE SENSOR DEVICE

CROSS-REFERENCE TO RELATED APPLICATIONS

This application is a National Stage of International patent application PCT/EP2016/056539, filed on Mar. 24, 2016, which claims priority to foreign French patent application Ser. No. FR 1500613, filed on Mar. 27, 2015, the disclosures of which are incorporated by reference in their entirety.

FIELD OF THE INVENTION

The invention relates generally to measurement systems, and in particular to optical fiber sensor devices and methods for manufacturing such devices.

BACKGROUND

An optical fiber sensor comprises a measurement optical fiber whose optical characteristics are sensitive to a physical quantity. When light is injected into the optical fiber, a light signal is generated and detected by the sensor. Signal is then converted and processed to return the measured quantity. Optical fiber sensors are widely used in various types of applications, not only because of their small bulk (relatively small size and weight) and their insensitivity to electromagnetic disturbances, but also because they are particularly suited to the techniques of multiplexing and to the implementation of amplifiers or of distributed sensors. They also make it possible to limit the intrusive-ness of the sensor in the environment.

Some optical fiber sensors use Bragg gratings inscribed in the fiber. A Bragg grating is a reflector comprising alternate layers of different refractive indexes, which provokes a periodic variation of the effective refractive index in the optical fiber. The fiber sensors with Bragg grating are used to measure a physical quantity which corresponds to a constraint applied to the sensor. The constraint applied to the sensor induces a wavelength variation.

The optical fiber sensors with Bragg gratings can be passive or active (optical fiber laser sensor).

The optical fiber sensors with Bragg gratings are arranged in a protective enclosure, passed through from side to side by the optical fiber. When mounting such a sensor, it is useful to leave a relaxed additional length of fiber inside the enclosure. In effect, in the absence of such an additional length, the taut optical fiber risks generating a stiffness in a wide range of operation (temperature range in particular) which is prejudicial to the correct operation of the sensor. Moreover, such an additional length allows the fiber to filter the mechanical disturbances which can come from outside the sensor.

A known solution for producing an additional length of fiber is illustrated in FIG. 1. According to this approach, at least one loop 23 is made with the fiber 22 in the enclosure 20 which houses the sensor 21, which makes it possible to clear an additional length. However, such a solution generates a significant bulk because of the minimum bending radius allowed for an optical fiber (of the order of a cm). This solution is not therefore suited to compact sensors.

SUMMARY OF THE INVENTION

The invention improves the situation. To this end, it proposes a method for manufacturing an optical fiber sensor device comprising an enclosure delimiting a cavity and an optical fiber sensor, the optical fiber sensor comprising an optical fiber and a holding device of the sensor secured to the optical fiber, the holding device being passed through by the optical fiber between two fixing points provided on the holding device. Advantageously, the method comprises the steps of:

positioning the optical fiber sensor in the enclosure so as to have the fiber pass through two passage openings provided on the enclosure, the optical fiber extending generally along a longitudinal axis in the cavity, which delimits two portions of optical fibers in the enclosure, on either side of the holding device, each portion of fiber extending between one of the fixing points of the holding device and one of the passage openings of the enclosure, substantially along a straight line;

holding the optical fiber sensor in position;

producing a differential elongation of the enclosure in relation to the optical fiber sensor in the longitudinal direction, and toward the outside of the enclosure, while the optical fiber sensor remains held in position;

fixing the optical fiber to the enclosure at said passage openings; and bringing the enclosure into a position of balance.

According to a feature, the step of differential elongation of the fiber is performed by mechanically stretching the enclosure in the longitudinal direction, on each side of the enclosure, toward the outside of the enclosure, while the enclosure is brought into the position of balance by relaxing the enclosure.

In one embodiment, the differential elongation $\Delta_L$ of the enclosure in relation to the optical fiber sensor satisfies a constraint relating to the ambient temperature $T_S$ at the time of the fixing of the fiber to the enclosure, to the maximum operating temperature $T_{max}$ of the fiber sensor, to the thermal expansion coefficient $\lambda_C$ of the fiber sensor and to the thermal expansion coefficient $\lambda_P$ of the enclosure.

In particular, the constraint is defined by the inequality:

$$\Delta_L \geq \frac{L_P}{2} \cdot \lambda_P (T_{max} - T_S) - \frac{L_C}{2} \cdot \lambda_C (T_{max} - T_S),$$

in which $\lambda_C$ denotes the thermal expansion coefficient of the holding device of the fiber sensor, $\lambda_P$ the thermal expansion coefficient of the enclosure, $L_C$ denotes the length of the fiber sensor, $L_P$ denotes the length of the enclosure, $T_S$ the ambient temperature at the time of fixing of the fiber to the enclosure, and $T_{max}$ the maximum operating temperature of the sensor.

In another embodiment, the step of differential elongation is performed by differential thermal expansion of the enclosure relative to the optical fiber sensor by increasing the temperature up to an expansion temperature greater than the maximum operating temperature defined for the optical fiber sensor device, while the enclosure is brought into the position of balance by bringing the temperature to a temperature less than the expansion temperature. More specifically, the enclosure is brought into the position of balance by bringing the temperature to a temperature lying within the operating range of the sensor which is therefore less than the expansion temperature.

The enclosure can then be chosen so as to have a thermal expansion coefficient according to the equation:

$$L_P \lambda_P > L_C \lambda_C,$$

in which $\lambda_C$ denotes the thermal expansion coefficient of the holding device of the sensor, $\lambda_P$ denotes the thermal expansion coefficient of the enclosure, $L_C$ denotes the length of the holding device, and $L_P$ denotes the length of the enclosure.

In particular, the differential elongation $\Delta'_L$ of the enclosure can be equal to:

$$\Delta'_L = \frac{L_P}{2} \cdot \lambda_P(T-T_1) - \frac{L_C}{2} \cdot \lambda_C(T-T_1)$$

in which $\lambda_C$ denotes the thermal expansion coefficient of the sensor, $\lambda_P$ the thermal expansion coefficient of the enclosure, $L_C$ denotes the length of the holding device, $L_P$ denotes the length of the enclosure, T the operating temperature, and $T_1$ the expansion temperature.

According to a complementary feature, the step of fixing of the fiber to the enclosure at the passage openings can comprise a gluing of the fiber at the blocking points.

The manufacturing method can further comprise the fixing of the fiber sensor to the enclosure in at least one connection zone.

The fixing of the sensor to the enclosure in at least one connection zone can notably be performed by gluing.

According to another feature, the step of positioning of the optical fiber sensor can comprise the longitudinal positioning of the optical fiber sensor substantially in the middle of the enclosure.

In one embodiment, the sensor can be a hydrophone.

The invention also proposes an optical fiber sensor device, comprising an enclosure delimiting a cavity, an optical fiber sensor, the optical fiber sensor comprising an optical fiber and a holding device secured to the optical fiber, the holding device being passed through by the optical fiber between two fixing points provided on the holding device. Advantageously, the optical fiber passes through the enclosure at two passage openings provided on the enclosure and extends generally along a longitudinal axis in the cavity, which delimits two portions of optical fibers of given lengths in the enclosure, on either side of the holding device, each portion of fiber extending between one of said fixing points of the holding device and the passage opening of the enclosure situated on the same side of the optical fiber sensor and being substantially in a straight line, each portion of fiber comprising a slackening such that the length of each portion of fiber extending between a fixing point of the holding device and a passage opening of the enclosure is greater than the geometrical distance between the fixing point of the holding device and the passage opening.

In particular, the wavelength of the light which passes through the optical fiber of the sensor device is a linear function of a stretching parameter corresponding to a stretching applied to the sensor device, the linear function exhibiting a break of slope for a critical value of the stretching parameter such that the directing coefficient of the linear function after the critical value is greater than the directing coefficient of the linear function before the critical value.

The invention thus makes it possible to perform a differential stretching of the container relative to the sensor before connecting the container to the optical fiber and/or sensor.

DESCRIPTION OF THE FIGURES

Other features and advantages of the invention will become apparent from the following description and the figures of the attached drawings in which.

The drawings and the appendixes to the description will not only be used to provide a better understanding of the description, but also will contribute to the definition of the invention, as necessary.

DETAILED DESCRIPTION

Figure 1:
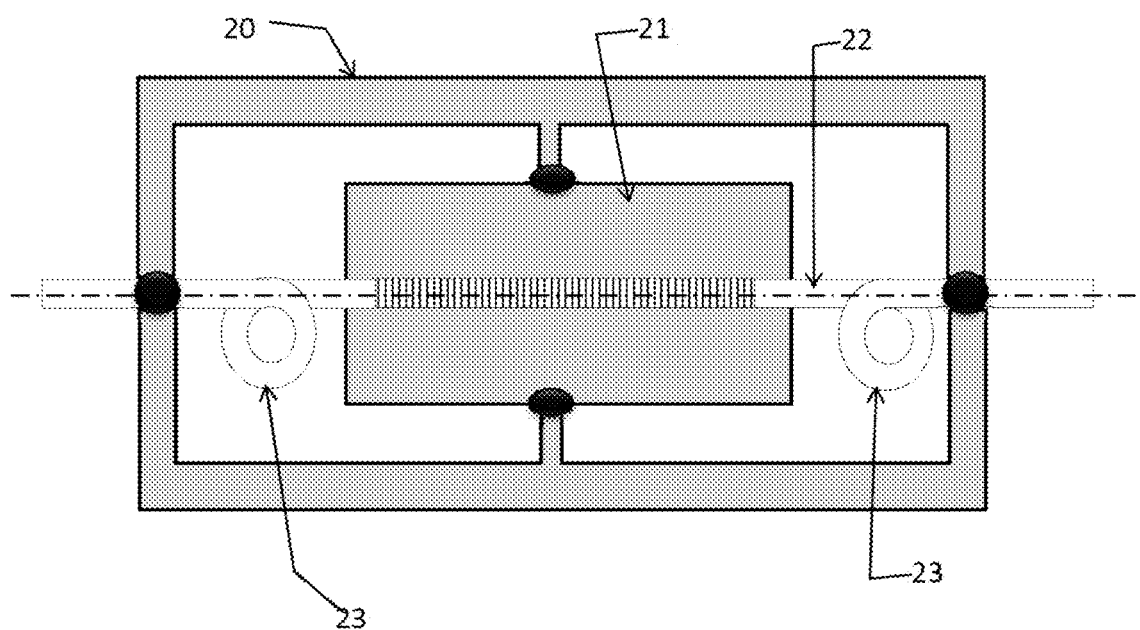
FIG. 1 is a diagram representing an optical fiber sensor device according to one approach of the prior art.
Figure 2:
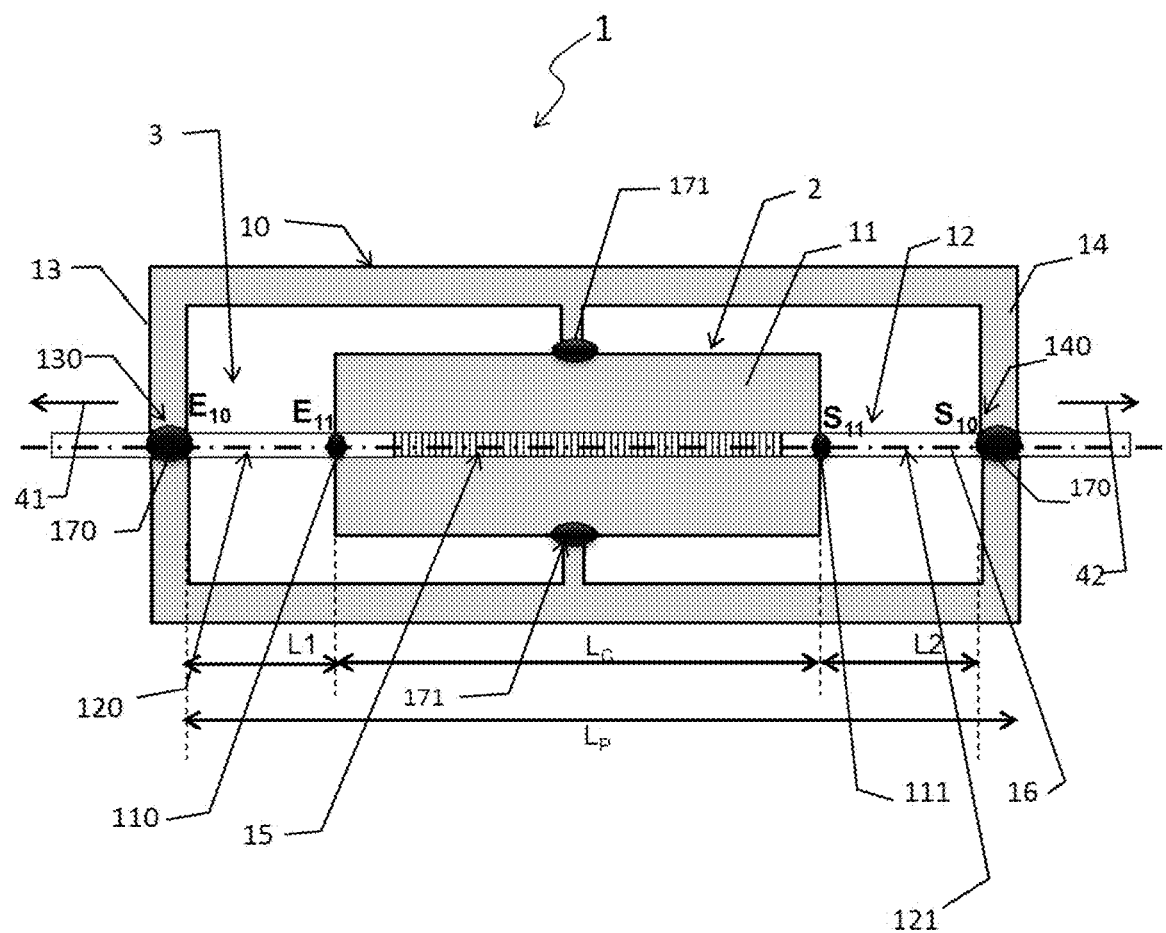
FIG. 2 is a diagram representing an optical fiber sensor device according to certain embodiments of the invention.

FIG. 2 represents an optical fiber sensor device 1 according to certain embodiments of the invention.

The optical fiber sensor device 1 comprises an enclosure 10 delimiting a cavity 3 and at least one optical fiber sensor 2 housed in the cavity 3. The invention will be described hereinbelow in relation to a single optical fiber sensor 2 housed in the cavity 3 as a nonlimiting example.

The optical fiber sensor 2 comprises an optical fiber 12 whose optical characteristics are sensitive to a physical quantity, and a holding device 11 secured to the optical fiber 12. The holding device 11 is passed through by the optical fiber and is fixed to the latter at two fixing points 110 and 111 provided on said holding device. The holding device 11 is configured to hold the fiber in position in the cavity 3. It can further comprise additional elements for mechanical amplification in certain acoustic applications for example.

The optical fiber sensor 2 can be any type of sensor configured to measure a physical quantity, such as, for example, an optical fiber hydrophone, a deformation, pressure, temperature, acceleration or other such sensor. Although not limited to such applications, such a fiber sensor 2 is particularly suited to acoustic hydrophone applications for detecting acoustic pressure variations. In effect, the electronic components do not have to be provided in the submerged part. Consequently, they can be towed easily and it is possible to multiplex several optical fiber sensor devices 1 on one and the same fiber.

The enclosure 10 can be configured to mechanically protect the sensor, particularly against impacts, against certain forces due to the environment (for example water), against corrosion, etc. The enclosure 10 can for example take the form of a rigid body such as a cylindrical tube whose generating straight line coincides substantially with the general axis of the optical fiber 12. The enclosure can be formed from several elements assembled together or have a single-piece structure.

The cavity 3 delimited by the enclosure 10 can be filled with a protective fluid such as oil to optimize the operation and the lifetime of the sensor.

The enclosure can be flexible or rigid and tight to isolate the fluid that it contains from the outside environment.

According to one aspect of the invention, the optical fiber 12 passes through the enclosure 10 in a seal-tight manner at two passage openings 130 and 140 provided on the enclosure. These passage openings can be arranged respectively on two faces of the enclosure, such as, for example, the two opposite faces 13 and 14. In the cavity 3, the optical fiber extends generally along a longitudinal axis, which delimits two portions of optical fibers 120 and 121 of given lengths, in the enclosure, on either side of the holding device 11. Each portion of fiber 120 and 121 extends between one of the passage openings of the enclosure 130 and 140 and the fixing point of the closest holding device (respectively 110 and 111). Thus, the portion of fiber 120 extends between the entry point $E_{10}$ of the enclosure 10, and the entry point $E_{11}$ of the holding device 11, in the cavity 3, whereas the portion of fiber 121 extends between the exit point $S_{10}$ of the enclosure 10 and the exit point $S_{11}$ of the holding device 11, in the cavity 3.

The optical fiber element 12, forming the active part of the sensor 2, thus penetrates into the cavity 3 through the point E10 and exits from the cavity through the point S10, by passing through the passage openings 130 and 140.

In addition, the optical fiber 12 can comprise at least one Bragg grating 15 inscribed on the fiber and configured to emit wavelengths sensitive to the mechanical constraint applied to the optical fiber 12. The measurement of these wavelength variations makes it possible to deduce the constraint applied to the optical fiber 12 and consequently to measure a physical quantity such as the acoustic pressure for example, by using an interrogation unit.

As is known, the optical fiber 12 can consist of a tube (for example silica tube) with a diameter of one hundred or so microns and comprise, at its center, a core forming a duct for channeling the light. The fiber can be lit by means of a laser beam with a periodic grating of interference fringes. The Bragg grating or gratings can be photo-inscribed one after the other on the fiber 12. In addition, the fiber 12 can comprise a protective jacket to mechanically protect the fiber.

The Bragg grating 15 can comprise a set of successive rings inscribed transversely in the core of the fiber (for example by photo-inscription), the distance between each ring representing the pitch of the grating which is representative of a given wavelength. When light is injected into the fiber 12, it can be propagated in the longitudinal direction (direction of the fiber) until it reaches the Bragg grating 15. The Bragg grating then filters the wavelength corresponding to its pitch by opposing the passage of the ray of this wavelength and by reflecting it. The spectrum of the beam reflected can then be analyzed. A deformation of the fiber leads to a modification of the pitch of the grating, and consequently a variation of the wavelength of the reflected beam about its initial value, this variation being proportional to the stretching of the fiber. The analysis of the variation of the wavelength thus makes it possible to measure the physical quantity having induced the deformation of the fiber (for example the acoustic pressure).

A person skilled in the art will understand that the invention is not limited to an optical fiber 12 comprising an inscribed Bragg grating and can be applied to other types of optical fibers, such as, for example, a wound fiber or a fiber of OFLS (Optical Fiber Laser Sensor) type provided with a Bragg grating.

In one embodiment, the enclosure 10 can comprise two opposing faces 13/14 each comprising a passage opening, respectively 130/140, to allow the passage of the optical fiber 12.

Figure 3:
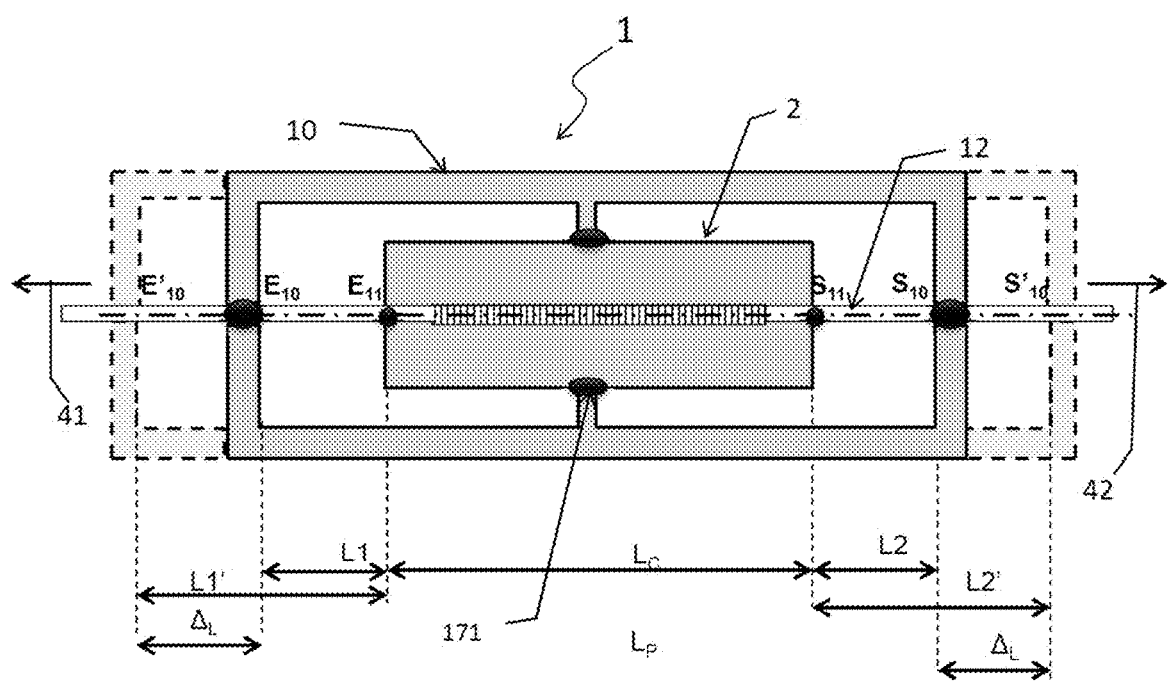
FIG. 3 is a diagram illustrating the differential elongation of the enclosure relative to the optical fiber sensor according to certain embodiments of the invention.

After assembly of the sensor device 1, the enclosure 10 is secured to the optical fiber 12 at the two passage openings 130 and 140 of the enclosure 10 and each portion 120 and 121 of the fiber 12 extends substantially along an axis (i.e. substantially in a straight line). The optical fiber 12 can be fixed to the enclosure 10 at the passage openings 130 and 140 by any rigid connection means such as, for example, by welding (e.g. laser welding) or gluing (e.g. gluing by polyamide coating or by epoxy glue). In the embodiment of FIG. 3, the fixing at the points of passage 130 and 140 between the fiber 12 and the enclosure is produced by using spots of glue 170.

In addition, the holding device 11 of the sensor 2 can be fixed to the enclosure 10 at connection points 171.

According to one aspect of the invention, the portions of the optical fiber 120 and 121 situated inside the cavity 3 on either side of the holding device 11 comprise a slackening produced by differential elongation of the enclosure 10 (also called "differential stretching" hereinbelow) relative to the optical fiber before the fixing of the fiber to the enclosure 10 at the passage openings 130 and 140 of the enclosure 10.

As used here, the term fiber "slackening" denotes the fact that the length of each portion of fiber 120 and 121 inside the cavity 3 is greater than the geometrical distance ($[E_{10}E_{11}]$ and $[S_{11}S_{10}]$) between the entry point $E_{10}$ (or respectively the exit point $S_{10}$) of the optical fiber 12 in the cavity 3 delimited by the enclosure 10 and the entry point $E_{11}$ (or respectively the exit point $S_{11}$) of the optical fiber 12 in the holding device 11 ($[E_{10}E_{11}]<L1$ and $[S_{11}S_{10}]<L2$). It should be noted that a slackening is present when the sensor is at rest (that is to say not excited by an acoustic pressure).

FIG. 3 illustrates the differential elongation of the enclosure 10 relative to the optical fiber sensor 2. The differential elongation of the enclosure 10 relative to the sensor is performed after the incorporation of the fiber sensor 2 in the enclosure 10, while the fiber sensor 2 (assembled) is held in position by any appropriate tools (the fiber sensor 2 thus remains fixed with no possibility of movement). The enclosure 10 passes from a first position (represented schematically by dotted lines in FIG. 3), following a differential elongation of the enclosure relative to the optical fiber sensor, to a position of balance after having fixed the fiber 12 at the passage openings 130 and 140 (represented by solid lines in FIG. 3). The enclosure 10 thus undergoes a variation of length between two instants, on each side of the fiber sensor 2, representing its differential stretching. Thus, the differential stretching $\Delta_{L_1}$ undergone by the enclosure 10 on the side of the passage opening 130 is given by the relationship:

$$\Delta_{L_1} = =L1'-L1$$

L1' represents the length between the entry point $E'_{10}$ of the enclosure 10 and the entry point $E_{11}$ of the holding device 11, in the cavity 3, in the first position of differential elongation of the enclosure 10.

L1 represents the length between the entry point $E_{10}$ of the enclosure 10 and the entry point $E_{11}$ of the holding device 11, in the cavity 3, in the position of balance of the enclosure 10.

Similarly, the differential stretching $\Delta_{L_2}$ undergone by the enclosure 10 on the side of the passage opening 140 is given by the relationship:

$$\Delta_{L_2} = L2'-L2$$

L2' represents the length between the exit point $S'_{10}$ of the enclosure 10 and the exit point $S_{11}$ of the holding device 11, in the cavity 3 in the first position of differential elongation of the enclosure 10.

L2 represents the length between the exit point $S_{10}$ of the enclosure 10 and the exit point $S_{11}$ of the holding device 11, in the cavity 3 in the position of balance of the enclosure 10.

The introduction of such a differential elongation during the manufacturing phase thus makes it possible to obtain a sensor device 1 exhibiting a slackening on each portion of fiber 120 and 121, after manufacture. The slackening of each portion of fiber 120 and 121 of the sensor device 1 thus depends on the stretching $\Delta_L$.

In particular, the slackening $D_1$ of the portion of fiber 120 satisfies the relationship:

$$D_1 \approx L1 + \Delta_{L1}$$

The slackening $D_2$ of the portion of fiber 121 satisfies the relationship:

$$D_2 \approx L2 + \Delta_{L2}$$

In a preferred embodiment, L1 is equal to L2 (L1=L2=L) and L1' is equal to L2' (L1'=L2'=L). The two portions of fibers 120 and 121 thus have substantially the same length. The rest of the description will be given with reference to this embodiment, as a nonlimiting example. The differential stretching of the enclosure, on each side of the sensor will thus be denoted:

$$\Delta_L = L' - L$$

The slackenings obtained on each portion of fiber 120 and 121 are then denoted:

$$D = D_2 = D_1 \approx L + \Delta_L$$

In a first embodiment, the differential elongation of the enclosure 10 relative to the optical fiber can be produced by mechanical stretching. In this embodiment, the stretching of the enclosure 10 can be produced by holding it mechanically extended before the fixing of the fiber 12 to the enclosure 10 (at the passage openings 130 and 140), for example by gluing at the fixing points (130, 140). Such a mechanical stretching can be performed by using a stretching device which is attached on either side of the enclosure 10 and stretching it longitudinally outward from the sensor device 1, as indicated by the arrows 41 and 42, while the optical fiber sensor 2 is held in position inside the cavity 3, either by prior fixing of the holding device 11 to the enclosure 10 at the connection points 171 (for example by gluing), or by using appropriate tools to hold the holding device in position (secured to the fiber) during the stretching.

In FIG. 3, the length $L_C$ denotes the length of the holding device 11 and the length $L_P$ denotes the length of the enclosure 10.

In this first embodiment, an excess length is thus obtained in each portion of fiber 120 and 121 by mechanical stretching of the enclosure 10, while the sensor 2 remains held in position. By considering that $T_S$ denotes the ambient temperature in the phase of fixing of the fiber and/or of the sensor 2 to the enclosure and that $T_{max}$ denotes the maximum operating temperature of the sensor 2, the stretching $\Delta_L$ of the enclosure 10 is produced so as to satisfy the following equation (mechanical stretching constraint):

$$\Delta_L \geq \frac{L_P}{2} \cdot \lambda_P (T_{max} - T_S) - \frac{L_C}{2} \cdot \lambda_C (T_{max} - T_S) \quad \text{(Equation 1)}$$

In the above equation, $\lambda_C$ denotes the thermal expansion coefficient of the holding device 11 of the sensor 2 and $\lambda_P$ denotes the thermal expansion coefficient of the enclosure 10. $L_C$, $L_P$, $\Delta'_L$ can notably be expressed in meters, $T_S$ and $T_{max}$ in degrees Celsius (° C.) and $\lambda_C$ and $\lambda_P$ in reciprocal degrees Celsius (° C.$^{-1}$).

The enclosure 10 can then be relaxed (by releasing it from the stretching device) after fixing of the fiber 12 to the enclosure 10 at the passage openings to revert to a position of balance, which generates a slackening Don each portion 120 and 121.

The mechanical stretching $\Delta_L$ produced by the stretching of the enclosure 10, according to the equation 1, before fixing of the fiber to the enclosure 10, at the passage openings 130 and 140, makes it possible to retain a slackening of fiber on each portion 120 and 121, even if the maximum operating temperature is reached.

In a second embodiment, the differential stretching of the enclosure 10 relative to the optical fiber can be produced by thermal expansion, before the fixing of the fiber 12 to the enclosure 10 at the passage openings.

The thermal expansion is produced such that the enclosure 10 undergoes an expansion greater than that of the sensor 2, under the effect of the temperature applied. In particular, the enclosure 10 can be chosen so as to have a thermal expansion coefficient according to the equation 2 below, which makes it possible to obtain an expansion of the enclosure 10 greater than that of the sensor 2.

$$L_P \lambda_P > L_C \lambda_C \quad \text{(Equation 2)}$$

During the thermal expansion, the sensor 2 is held in position inside the cavity 3 either by prior fixing of the holding device 11 to the enclosure 10 at the connection points 171, or by using appropriate tools to hold the holding device 11 in position (secured to the fiber) during the expansion.

In this embodiment, the fixing of the fiber 12 to the enclosure 10 at the passage openings 130 and 140 and/or the fixing of the optical fiber sensor 2 to the enclosure 10 at the connection points 171 can advantageously be performed at a temperature greater than the maximum temperature of use of the sensor device 1.

Throughout the temperature operating range, the portions of fiber 120 and 121 are thus relaxed because of the differential shrinkage of the enclosure 10 relative to the sensor 2.

By considering that the fixing of the fiber 12 to the enclosure 10 (for example by gluing) at the passage openings is performed at a temperature $T_1$, a variation $\Delta'_L$ of the fiber can be obtained by thermal expansion, for an operating temperature $T < T_1$, according to the following equation:

$$\Delta'_L = \frac{L_P}{2} \cdot \lambda_P (T - T_1) - \frac{L_C}{2} \cdot \lambda_C (T - T_1) \quad \text{(Equation 3)}$$

$L_C$, $L_P$, $\Delta'_L$ can notably be expressed in meters, T and $T_1$ can be expressed in degrees Celsius (° C.) and $\lambda_C$ and $\lambda_P$ in reciprocal degrees Celsius (° C.$^{-1}$).

To obtain relaxed portions of fiber 120 and 121 inside the cavity 3 delimited by the enclosure 10, the variation of length $\Delta'_L$ defined in the equation 3 satisfies $\Delta'_L < 0$ whatever the temperature T in the range of operation of the sensor, which amounts to choosing the materials of the sensor 2 and of the enclosure 10 so as to satisfy the equation 2.

Figure 4:
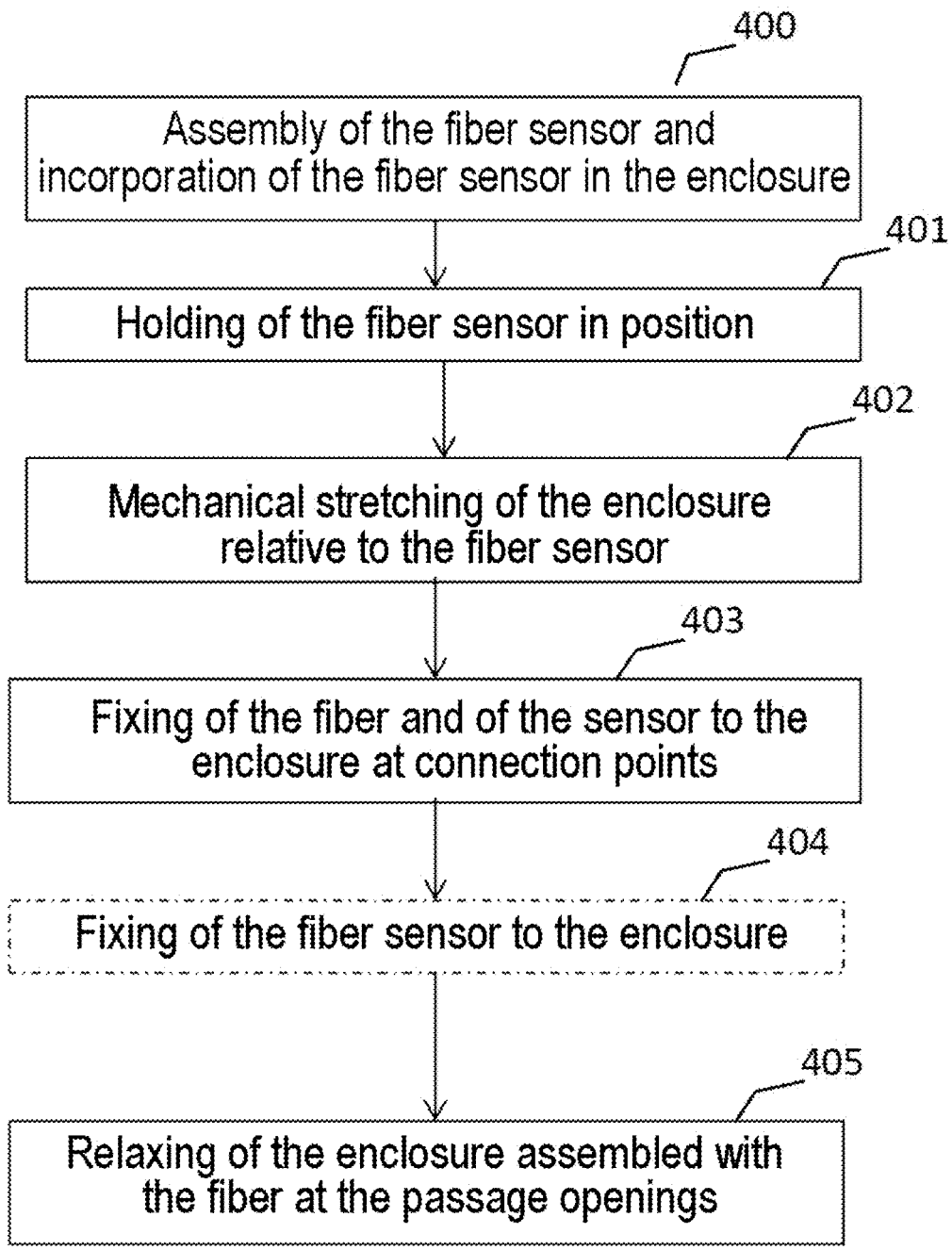
FIG. 4 is a flow diagram representing the method for manufacturing an optical fiber sensor device according to an embodiment of the invention.

FIG. 4 illustrates the method for manufacturing the optical fiber sensor device 1, according to the first embodiment, or the differential stretching is produced mechanically before the fixing of the fiber and of the enclosure at the passage openings 130 and 140.

In the step 400, the optical fiber sensor 2 is assembled and incorporated in the enclosure 10 such that the fiber 12 passes through the passage openings 130 and 140, without being fixed to the latter and that each portion of fiber 120 and 121 extends substantially in a straight line. In this phase, the fiber sensor 2 can be positioned substantially in the middle of the cavity 3.

In the step 401, the optical fiber sensor 2 is held in position. In one embodiment, it can be held in position by fixing the holding device 11 of the sensor 2 to the enclosure at the connection points 171, for example by gluing. As a variant, the optical fiber sensor 2 can be held in position by using appropriate tools.

In the step 402, a differential stretching of the enclosure 10 relative to the sensor 2 is produced mechanically along the longitudinal axis 16 at each end face 13 and 14 of the enclosure 10 on which is arranged one of the passage openings 130 and 140, toward the outside of the enclosure 10 (according to the arrows 41 and 42 represented in FIG. 3), by using, for example, a stretching device which is attached on either side of the enclosure 10 on each end face 13 and 14.

In the step 403, the fiber 12 is fixed to the enclosure at each passage opening 130 and 140, for example by gluing. Assuming that the fixing of the fiber 12 to the enclosure 10 is performed at a temperature $T_S$, the mechanical stretching of the enclosure is such that the enclosure undergoes an elongation $\Delta_L$, according to the equation 1.

In the embodiments, where the sensor 2 is held in position in the step 401, without fixing of the sensor 2 to the enclosure at the connection points 171, the method can comprise the step 404 of fixing of the holding device 11 of the sensor 2 to the enclosure 10 at the connection points 171. As a variant, this step of fixing of the holding device 11 of the sensor 2 to the enclosure 10 can be performed before or during the step 403.

In the step 405, the enclosure 10, to which the portions of fiber 120 and 121 are fixed at the passage openings and the holding device of the sensor 2, is relaxed so that the enclosure reverts to position. The result thereof is a slackening on each portion of fiber 120 and 121.

The optical fiber sensor device 1 thus obtained can then be used in any operating environment in which the temperature is less than $T_{max}$.

Figure 5:
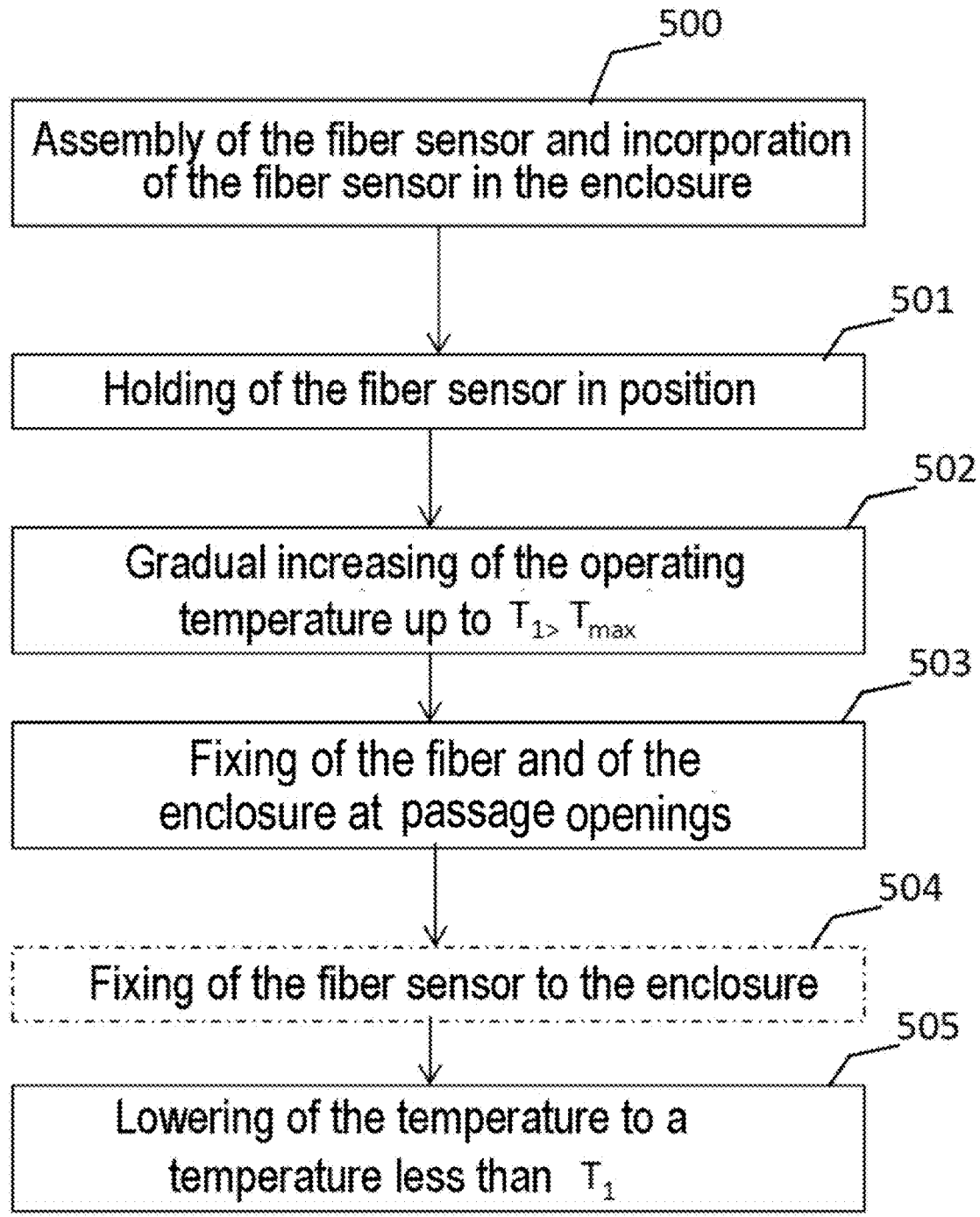
FIG. 5 is a flow diagram representing the method for manufacturing an optical fiber sensor device according to another embodiment of the invention.

FIG. 5 illustrates the manufacturing method according to the second embodiment in which the stretching of the fiber is produced by thermal expansion.

In the step 500, the optical fiber sensor 2 is assembled and incorporated in the enclosure 10 such that the fiber 12 passes through the passage openings 130 and 140, without being fixed to the latter and that each portion of fiber 120 and 121 extends substantially in a straight line, as described in relation to the step 400 of FIG. 4.

In the step 501, the optical fiber sensor 2 is held in position as described in relation to the step 401 of FIG. 4 (by means of holding tools or by prior fixing of the holding device of the sensor 11 to the enclosure 10).

In the step 502, the pre-assembled elements of the fiber sensor device 1 are exposed to a temperature T greater than the maximum operating temperature $T_{max}$ of the sensor device 1, by using a heating system. The heating system is started up between a starting temperature $T_0$ and the temperature is increased until the temperature is stabilized at the temperature $T_1$.

By increasing the operating temperature gradually up to the temperature $T_1$ while holding the optical fiber sensor 2 in position, the enclosure 10 expands more than the sensor 2, which generates a differential elongation of the enclosure 10 relative to the sensor 2.

In the step 503, the fiber 12 is fixed to the enclosure at each passage opening 130 and 140, for example by gluing. By assuming that the fixing of the fiber 12 to the enclosure 10 is performed at the temperature $T_1$, the thermal expansion method makes it possible to obtain a differential elongation $\Delta'_L$ of the enclosure relative to the sensor, according to the equation 3. A slackening thus occurs in each portion of fiber 120 and 121 which depends on this differential elongation.

In the embodiments in which the sensor 2 is held in position in the step 501, without fixing of the sensor 2 to the enclosure at the connection points 171, the method can comprise a step 504 of fixing of the holding device 11 of the sensor 2 to the enclosure 10 at the connection points 171. As a variant, this step of fixing of the holding device 11 of the sensor 2 to the enclosure 10 can be performed at any time before, during or after the step 503.

In the step 505, the enclosure is brought to a temperature less than T1 (for example ambient temperature), which makes it possible to bring it to a position of balance.

The optical fiber sensor device 1 thus obtained can then be used in any operating environment in which the temperature is less than $T_1$.

The different embodiments proposed thus make it possible to obtain a slackening of the portions of optical fiber 120 and 121 on either side of the sensor 2, before fixing of the fiber to the enclosure at the passage openings. The excess length of fiber thus obtained makes it possible to limit the risk of stiffness of the taut fiber regardless of the operating range (in particular whatever the temperature range) while filtering the mechanical disturbances which can come from the exterior of the sensor via the fiber 12.

Figure 6:
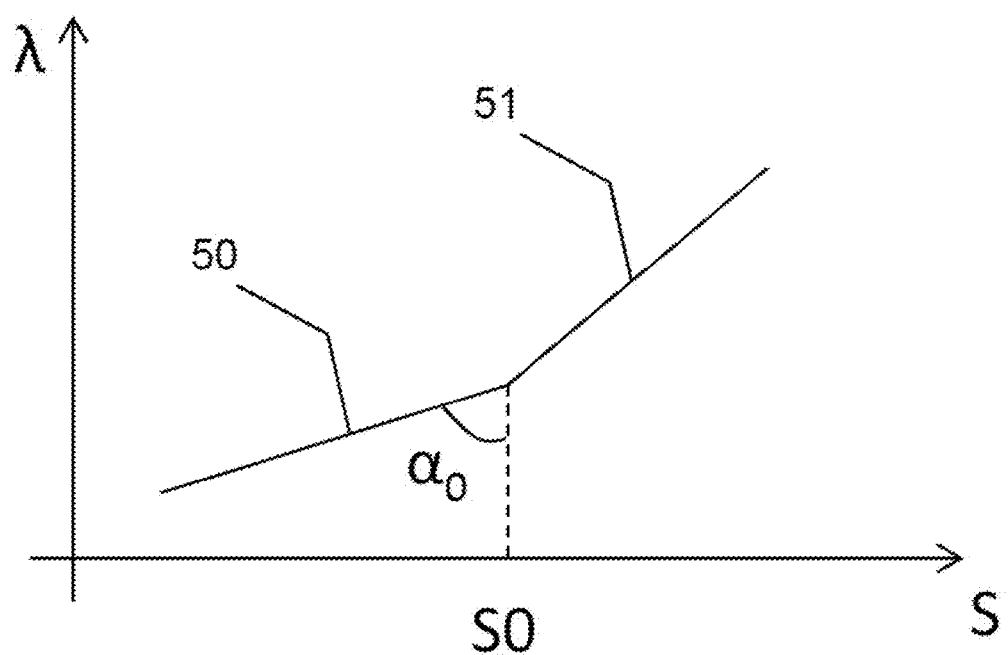
FIG. 6 is a diagram representing the trend of the wavelength as a function of a stretching parameter corresponding to a stretching applied to the sensor device.

The optical fiber sensor device 1 thus obtained is characterized by a particular law of variation of the wavelength relative to a stretching applied to the device, as illustrated in FIG. 6, whatever the stretching method applied (by thermal expansion, by mechanical stretching) and independently of the stretching method applied while manufacturing the sensor device 1. More specifically, the wavelength of the light which passes through the optical fiber of the sensor device 1 is a linear function of a stretching parameter corresponding to a stretching applied to the sensor device, the linear function exhibiting a break of slope for a critical value of the stretching parameter.

Thus, if a gradual stretching is applied to the sensor device 1 (after manufacture), represented by a stretching parameter S, it has been observed that the wavelength λ progresses as a function of the stretching S to a critical value S0 according to a first ascending straight line 50 and, after the critical value S0, according to a second ascending straight line 51, the directing coefficient of the second straight line being greater than the directing coefficient of the first straight line 50. The break of slope (translation from the first straight line 50 to the second straight line 51) thus occurs at the point S0 which can correspond substantially to the temperature of gluing of the fiber to the enclosure 10 or to the maximum stretching of the enclosure 10 depending on the embodiment of the manufacturing method. Once the break point is reached, the fiber 12, inside the cavity 3, is stretched. Such a characteristic behavior of the fiber sensor device 1 can be observed for example by placing the sensor device 1 (after manufacture) in an oven where the temperature is gradually increased to produce a stretching of the device by thermal expansion (in this case, the stretching parameter S can be the temperature) or by mechanically stretching the sensor device 1.

The different embodiments of the invention consequently make it possible to obtain a good operation of the optical fiber sensor device 1 in a wide range of use, particularly in terms of temperature, by introducing such an excess length of fiber between the sensor 2 and its enclosure 10, during the method for manufacturing the device 1. Such a solution has no impact on the volume of the cavity 3 delimited by the enclosure 10. Moreover, the different embodiments of the invention limit the risk of break of the optical fiber. In effect, since the fiber movements are very small, the elongation of the fiber during the manufacturing method does not generate buckling of the optical fiber likely to provoke a break of the fiber 12. By producing the elongation directly during the manufacturing process, a relatively compact fiber sensor 1 can be obtained, without embrittling the optical fiber, which is particularly useful in certain applications such as the acoustic applications in which the optical fiber sensor 1 is used as hydrophone.

The invention is not limited to the embodiments described above as nonlimiting examples. It encompasses all the variant embodiments which will be able to be envisaged by a person skilled in the art. In particular, the invention is not limited to a particular number of connection zones between the sensor 2 and the enclosure 10. In addition, it is not limited to a particular sensor application or to a particular form of enclosure. In some embodiments in particular the enclosure 10 can be made of different materials and of different elements assembled together to form an enclosure.

Moreover, although the invention has been described in relation to an embodiment in which the enclosure 10 comprises a single fiber sensor 2, it can be applied equally to a plurality of sensors mounted in parallel (the set of sensors being able for example to be held by a common holding device 11) or mounted in series.

The invention claimed is:

1. A method for manufacturing an optical fiber sensor device, comprising an enclosure delimiting a cavity and an optical fiber sensor, said optical fiber sensor comprising an optical fiber and a holding device of the sensor secured to the optical fiber, said holding device being passed through by the optical fiber between two fixing points provided on said holding device, comprising the steps of:
   positioning the optical fiber sensor in the enclosure so as to have the fiber pass through two passage openings provided on the enclosure, the optical fiber extending generally along a longitudinal axis in said cavity, which delimits two portions of optical fibers in the enclosure, on either side of the holding device, each portion of fiber extending between one of said fixing points of the holding device and one of said passage openings of the enclosure, substantially along a straight line;
   holding the optical fiber sensor in position;
   producing a differential elongation of the enclosure in relation to the optical fiber sensor in the longitudinal direction, and toward the outside of the enclosure, while the optical fiber sensor remains held in position;
   fixing the optical fiber to the enclosure at said passage openings; and
   bringing the enclosure into a position of balance.

2. The manufacturing method as claimed in claim 1, wherein said step of differential elongation of the fiber is performed by mechanically stretching the enclosure in said longitudinal direction, on each side of the enclosure, toward the outside of the enclosure, and in that the enclosure is brought into said position of balance by relaxing the enclosure.

3. The manufacturing method as claimed in claim 2, wherein the differential elongation $\Delta_L$ of the enclosure in relation to the optical fiber sensor satisfies a constraint relating to the ambient temperature $T_S$ at the time of the fixing of the fiber to the enclosure, to the maximum operating temperature $T_{max}$ of the fiber sensor, to the thermal expansion coefficient $\lambda_C$ of the fiber sensor and to the thermal expansion coefficient $\lambda_P$ of the enclosure.

4. The manufacturing method as claimed in claim 3, wherein said constraint is defined by the inequality:

$$\Delta_L \geq \frac{L_P}{2} \cdot \lambda_P (T_{max} - T_S) - \frac{L_C}{2} \cdot \lambda_C (T_{max} - T_S),$$

in which $\lambda_C$ denotes the thermal expansion coefficient of the fiber sensor, $\lambda_P$ the thermal expansion coefficient of the enclosure, $L_C$ denotes the length of the fiber sensor, $L_P$ denotes the length of the enclosure, $T_S$ the ambient temperature at the time of the fixing of the fiber to the enclosure, and $T_{max}$ the maximum operating temperature of the sensor.

5. The manufacturing method as claimed in claim 1, wherein said step of differential elongation is performed by differential thermal expansion of the enclosure relative to the optical fiber sensor by increasing the temperature up to an expansion temperature greater than the maximum operating temperature defined for the optical fiber sensor device, and wherein the enclosure is brought into said position of balance by bringing the temperature to a temperature less than the expansion temperature.

6. The manufacturing method as claimed in claim 5, wherein the enclosure is chosen so as to have a thermal expansion coefficient according to the equation:

$$L_P \lambda_P > L_C \lambda_C,$$

in which $\lambda_C$ denotes the thermal expansion coefficient of the holding device of the sensor, $\lambda_P$ the thermal expansion coefficient of the enclosure, $L_C$ denotes the length of the holding device, and $L_P$ denotes the length of the enclosure.

7. The manufacturing method as claimed in claim 6, wherein the differential elongation of the enclosure is equal to:

$$\Delta'_L = \frac{L_P}{2} \cdot \lambda_P (T - T_1) - \frac{L_C}{2} \cdot \lambda_C (T - T_1)$$

in which $\lambda_C$ denotes the thermal expansion coefficient of the sensor, $\lambda_P$ the thermal expansion coefficient of the enclosure, $L_C$ denotes the length of the holding device, $L_P$ denotes the length of the enclosure, $T$ the operating temperature, and $T_1$ the expansion temperature.

8. The manufacturing method as claimed in claim 1, wherein the step of fixing of the fiber to the enclosure at the passage openings comprises a gluing of the fiber at the blocking points.

9. The manufacturing method as claimed in claim 1, comprising the fixing of the fiber sensor to the enclosure in at least one connection zone.

10. The manufacturing method as claimed in claim 9, wherein the fixing of the sensor to the enclosure in at least one connection zone is performed by gluing.

11. The manufacturing method as claimed in claim 1, wherein the step of positioning of the optical fiber sensor comprises the longitudinal positioning of the optical fiber sensor substantially in the middle of the enclosure.

12. The manufacturing method as claimed in claim 1, wherein the sensor is a hydrophone.

* * * * *